M. P. CURLEE.
SEED-PLANTER AND FERTILIZER DISTRIBUTER.

No. 170,823. Patented Dec. 7, 1875.

WITNESSES:
A. W. Almqvist
A. F. Terry

INVENTOR:
Merideth P. Curlee
BY
Munn & Co.
ATTORNEYS.

UNITED STATES PATENT OFFICE.

MERIDETH P. CURLEE, OF CORINTH, MISSISSIPPI.

IMPROVEMENT IN SEED-PLANTERS AND FERTILIZER-DISTRIBUTERS.

Specification forming part of Letters Patent No. 170,823, dated December 7, 1875; application filed July 17, 1875.

*To all whom it may concern:*

Figure 1:
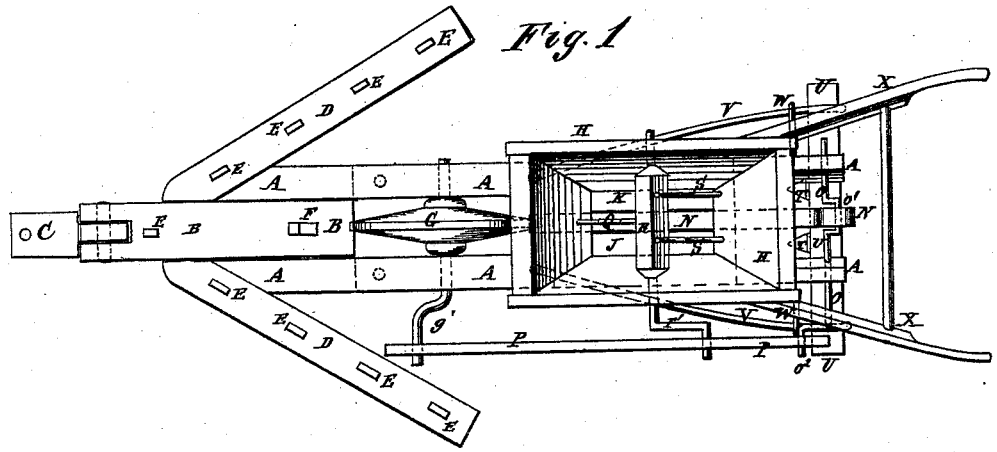
Figure 2:
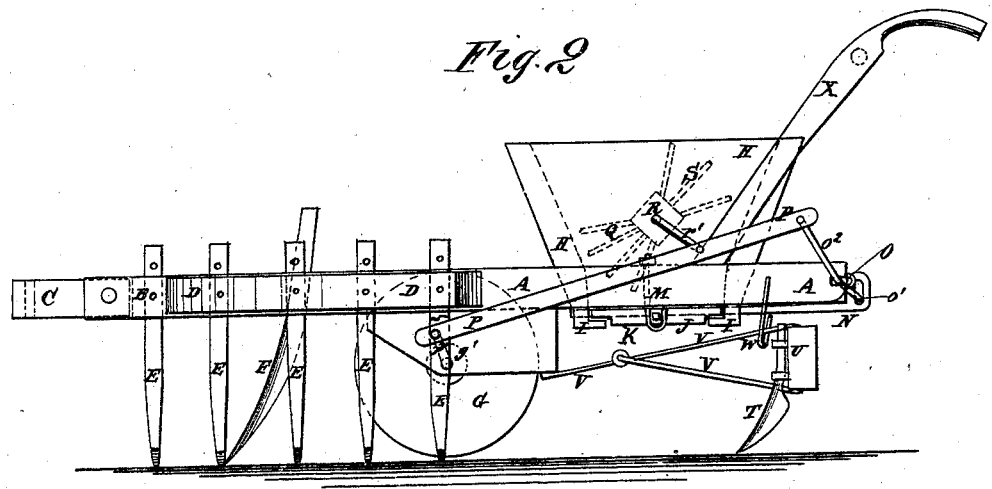
Figure 3:
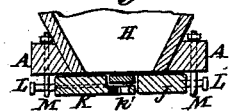
Figure 4:
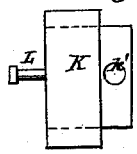

Be it known that I, MERIDETH P. CURLEE, of Corinth, in the county of Alcorn and State of Mississippi, have invented a new and useful Improvement in Seed-Planter and Fertilizer-Distributer, of which the following is a specification:

Figure 1 is a top view of my improved machine. Fig. 2 is a side view of the same. Fig. 3 is a detail cross-section of the frame, the lower part of the hopper, and the slides. Fig. 4 is a detail view of one of the slides.

Similar letters of reference indicate corresponding parts.

The invention will first be described in connection with drawing, and then pointed out in claims.

A are the beams or bars, the forward ends of which are attached to the opposite sides of a beam, B. To the forward end of the beam B is jointed a short beam, C, to which the draft is attached, so that the machine may be free to adjust itself to the surface of the ground. The forward ends of the side beams A are beveled off to receive the forward parts of the inclined beams D, which are secured to them and to the center-beam B. E are harrow-teeth, which are placed in mortises in the inclined beams D, and in the forward part of the center-beam B, and are secured in place by bolts passing through them, and through the said beams, several holes being formed in the said teeth to receive the said bolts, so that the teeth may be raised and lowered to work shallower or deeper in the ground, as may be desired. F is a plow for opening a furrow to receive the seed. The shank of the plow F is inserted in a mortise in the rear part of the beam B, and is secured in place by a wedge or other suitable means. G is a wheel, the journals of which work in bearings attached to the side beams A. The wheel G is made V-shaped, and follows the plow F, so as to press back and pack the sides of the furrow opened by the said plow F, and prevent them from falling in and partially filling the furrow before the seed has been deposited in it. To the beams A, in the rear of the wheel G, is attached the seed-hopper H, the lower edge of which projects to the lower sides of the said beams A. To the beams A, directly beneath the lower edges of the front and rear sides of the hopper H, are attached cross-bars I, the upper parts of the inner sides of which are rabbeted, to adapt them to serve as ways for the laterally-operating slides J K, which form the bottom of the hopper H, and to the outer edges of which are attached the bolts or pins L, to serve as handles for handling the slides. M are hook-bolts, the hooks of which are hooked around the handles L, and which pass up through the beams A, and have nuts screwed upon their upper ends. The slide K is made wider than the slide J, and has a wide rabbet formed in the upper side of its inner edge, to form a groove for the dropping-slide N, and has a hole, $k'$, formed in it, through which the seed escapes from the said dropping-slide N to the ground. The slide N has one or two holes formed it of such a size as to contain enough seed for a hill, and which may be made adjustable by being formed, in whole or in part, in a block inserted in the said bar N. The sliding bar N projects at the rear side of the hopper H, and is connected with a crank, $o^1$, formed upon a shaft, O, which works in bearings attached to the rear ends of the beams A, and upon one end of which is formed a crank, $o^2$, to enter a hole in the rear end of the pitman P, the forward end of which is pivoted to a crank, $g'$, formed upon the journal of the wheel G, so that the dropping-slide N may be operated to drop the seed by the advance of the machine. As thus described, the machine is adjusted for dropping corn, peas, and other smooth seeds.

When the machine is to be used for dropping cotton-seed and distributing manure, the slides K N are removed, and the slide K is replaced by a slide similar to the slide J, so that a narrow opening may be left between the inner edges of the said slides, for the escape of the seed or manure. Both of the slides K and J are removable, by simply unscrewing the nuts at the tops of the hooked bolts M, and dropping said bolts slightly down through their openings, so that the handles L will pass over the hooks.

The seed or manure is pushed out through the opening between the slides J by the fingers or prongs Q (five, more or less,) attached to the lower side of the shaft R, and which, as the said shaft is rocked, move back and forth through the lower part of the hopper H, and thus push the seed or manure out through the discharge-opening.

To the upper side of the shaft R are attached two sets of fingers or prongs, S, which, as the said shaft rocks, keep the seed or manure from clogging in the upper part of the hopper H. One end of the shaft R projects, and has a crank, $r'$, formed upon it, the crank-pin of which enters a hole in the middle part of the pitman P, so that the agitator may be oscillated by the advance of the machine. T are the covering plows, which are attached to the block U at such a distance apart, and in such positions, as to work upon the opposite sides of, and throw the soil into, the furrow opened by the plow F and wheel G.

The plows T are designed to be secured to the block U by two bolts, the upper one being an ordinary bolt, and the lower one being a hook-bolt, so that by loosening the nuts of the said hook-bolts the plows may be turned up laterally and placed upon the hooks attached to the frame-work of the machine, so as to be out of the way when not required for use.

The block U is designed to rest upon, and be drawn along the surface of, the ground, to complete the covering the seed, and smooth off the top of the row. The block U is attached to, and drawn by, the double springs V, which are attached to it at or near its ends. The forward ends of the longer parts of the springs V are attached to the frame of the machine; and the forward ends of the shorter parts of the said springs are connected with the middle parts of the said longer parts, as shown in Fig. 2. W are hooks connected with the rear parts of the frame of the machine, and hooking around the upper rear part of the springs V, for convenience in passing over roots and other obstructions. X are the handles, which are attached to the rear part of the hopper H, or side beams A, or to both.

Having thus described my invention, I claim as new and desire to secure by Letters Patent—

The combination of the laterally-operating and detachable slides J K, having handles L, the hooked bolts M M, bars I I, and slide N, with the hopper and the operating devices, all substantially as and for the purposes set forth.

MERIDETH P. CURLEE.

Witnesses:
  W. P. CURLEE,
  M. E. CURLEE.